United States Patent [19]
Mishima

[11] Patent Number: 5,960,038
[45] Date of Patent: Sep. 28, 1999

[54] SERIAL DATA TRANSMISSION APPARATUS

[75] Inventor: Nobuhiro Mishima, Toyokawa, Japan

[73] Assignee: Minolta Co., Ltd., Osaka, Japan

[21] Appl. No.: 08/502,851

[22] Filed: Jul. 14, 1995

[30] Foreign Application Priority Data

Jul. 15, 1994 [JP] Japan ................................ P06-163575

[51] Int. Cl.⁶ ................................................. H04L 27/00
[52] U.S. Cl. ............................................ 375/259; 355/35
[58] Field of Search .................................. 375/259, 340, 375/957; 355/35, 38

[56] References Cited

U.S. PATENT DOCUMENTS

| | | | |
|---|---|---|---|
| 4,045,771 | 8/1977 | Loreck | 340/166.1 |
| 4,216,426 | 8/1980 | Flora | 375/257 |
| 4,271,526 | 6/1981 | Flora | 375/257 |
| 4,282,601 | 8/1981 | Flora | 375/257 |
| 4,455,128 | 6/1984 | Dolan et al. | |
| 4,634,260 | 1/1987 | Watanabe | |
| 4,750,115 | 6/1988 | Sekiya et al. | |
| 4,864,303 | 9/1989 | Ofek | 341/95 |
| 5,164,769 | 11/1992 | Hashimoto et al. | 355/202 |
| 5,465,160 | 11/1995 | Kamo et al. | 358/401 |
| 5,581,358 | 12/1996 | Seto et al. | 358/298 |

FOREIGN PATENT DOCUMENTS

| | | |
|---|---|---|
| 441399 | 7/1992 | Japan. |
| 441400 | 7/1992 | Japan. |

*Primary Examiner*—Tesfaldet Bocure
*Attorney, Agent, or Firm*—Burns, Doane, Swecker & Mathis, L.L.P.

[57] ABSTRACT

In transmission of a serial digital data, a serial digital data and inverted data thereof are generated first. Then, one of the serial digital data, and an inverted data of the one of the serial digital data are transmitted successively after the one of the serial digital data according to clock signals. Thus, a pair of the one of the serial digital data and the inverted data is transmitted through a transmission line in the order of the serial digital data. Among the received signals, a first data is sampled at a leading or trailing edge of the clock signal, while a second data is sampled at a trailing or leading edge of the clock signal just after the leading or trailing edge. Then, the first data is stored as a data in a serial data only if the second data is an inverted logical data of the first data. Thus, the serial data are transmitted and latched correctly without interrupting serial transmission even when the received signals include noises.

23 Claims, 17 Drawing Sheets

SERIAL DATA TRANSMISSION APPARATUS

BACKGROUND OF THE INVENTION

1. Field of the Invention

The present invention relates to a serial data transmission apparatus which transmits data in synchronization with clock signals.

2. Description of the Prior Art

Various apparatuses are known for transmitting serial data in synchronization with clock signals. For example, a multi-bit light emitting diode (LED) eraser unit is used in an electrophotographic copying machine for erasing an area not used for printing in an electrostatic latent image formed on a photoconductor. Serial data transmission may be used for turning on or off each LED in the unit for simplifying a harness provided for signal lines, especially for an eraser having thirty or more LEDs.

When an LED eraser unit adopts serial data transmission, serial signals such as data on turning on or off each LED, clock signals, latch signals and/or the like are sent from a controller for erasing to the eraser unit. However, because signal lines are long, there are many noise sources around the signal lines. Then, noises are liable to be added to the serial signals, to cause malfunctions of the eraser unit.

In order to prevent erroneous transmission of serial data, it is proposed to detect an error by communication between a controller and an option unit such as an LED eraser or the like, and to send the signal again after processing the erroneous signal. For example, a controller disclosed in Japanese Patent Publication 4-41400/1992 detects if an answer is received from an option unit within a prescribed time after a signal is sent to the option unit. If it does not receive the answer, it decides that a transmission error happened and it sends the same signal again. A controller disclosed in Japanese Patent Publication 4-41399/1992 detects if an answer is received from an option after a signal is sent to the option and decides that an error happens when it does not receive the answer after a number of prescribed times.

However, a unit such as an LED eraser unit is required to be controlled in real time. Then, if noises are induced in transmission lines between the controller and the unit, the unit does not operate normally. For example, an LED eraser unit has to be controlled in synchronization with the rotation of the photoconductor drum. Then, if noises are induced in signals, or even in one signal such as a clock signal, the timing, for example, of turning on LEDs is shifted from the proper timing, and quality of an image formed on a paper may be deteriorated.

SUMMARY OF THE INVENTION

An object of the present invention is to provide a serial data transmission apparatus which can detect and remove noises without shifting timings of serial data transmission when a signal has noises.

In an aspect of the invention, a first memory means stores a serial digital data, while a second memory means stores inverted data of the serial digital data. A data transmission means transmits clock signals, and one of the serial digital data from the first memory means, and an inverted data of the one of the serial digital data from the second memory means successively after the one of the serial digital data, wherein the one of the serial digital data and the inverted data being transmitted for each of the clock signals in the order of the serial digital data. The data, the inverted data and the clock signal are transmitted, and a first data is sampled at a leading or trailing edge of the clock signal while a second data is sampled at a trailing or leading edge of the clock signal just after the leading or trailing edge. The first data is stored as a data in a serial data only if the second data is an inverted logical data of the first data.

In a second aspect of the invention, a first data generator generates a serial digital data, while a second data generator generates inverted data of the serial digital data. A transmission means transmits the data and the inverted data according to clock signals so that one of the serial digital data and the inverted data thereof comprises a pair of data. Then, a first data and a second data are acquired from transmitted signals in response to the clock signals. The first data is output as the one of the serial data if the second data is the inverted digital data of the first data.

In a third aspect of the invention, an erasing apparatus of the invention comprises a light source comprising a plurality of aligned light-emitting elements and set at a position opposing a photoconductor. A first data generator generates a serial digital data used for driving the light-emitting elements of the light source, while a second data generator generates a data which is an inverted data of the data. The inverted data is delayed by a time within a half of a period of the clock signal. A transmission means transmits clock signals generated by the clock generator, the generated data, and the inverted data generated and delayed as mentioned above. The data is acquired in synchronization of a leading or trailing edge of the clock signal, and the inverted data in synchronization of a trailing or leading edge thereof, and the data is stored if the acquired inverted data is found to be the inverted data of the acquired data. Thus, the transmitted serial data is used for driving the light-emitting elements of the light source simultaneously at a prescribed timing.

In a fourth aspect of the invention, an erasing apparatus of the invention comprises a linear light source comprising a plurality of light-emitting elements set at a position opposing a photoconductor. A first data generator generates a serial data used for driving the light-emitting elements of the light source, while a second data generator generates a data which is an inverted data of the data generated by the first data generator. A clock generator generating clock signals for acquiring data each in a data acquisition period. The inverted data is delayed by a time within a half of the data acquisition period. One of the serial data generated by the first data generator and the inverted data are acquired alternately, and the one of the serial data is stored only if the one of the serial data and the inverted data are inverted digital data each other.

An advantage of the present invention is that a serial data transmission apparatus transmits data correctly without shifting timings of serial data transmission when a signal includes noises.

BRIEF DESCRIPTION OF THE DRAWINGS

These and other objects and features of the present invention will become clear from the following description taken in conjunction with the preferred embodiments thereof with reference to the accompanying drawings, and in which:

FIG. 4 is a diagram of a register provided in the eraser unit;

FIG. 5 is another diagram of a register provided in the eraser unit;

DETAILED DESCRIPTION OF THE PREFERRED EMBODIMENTS

Figure 1:
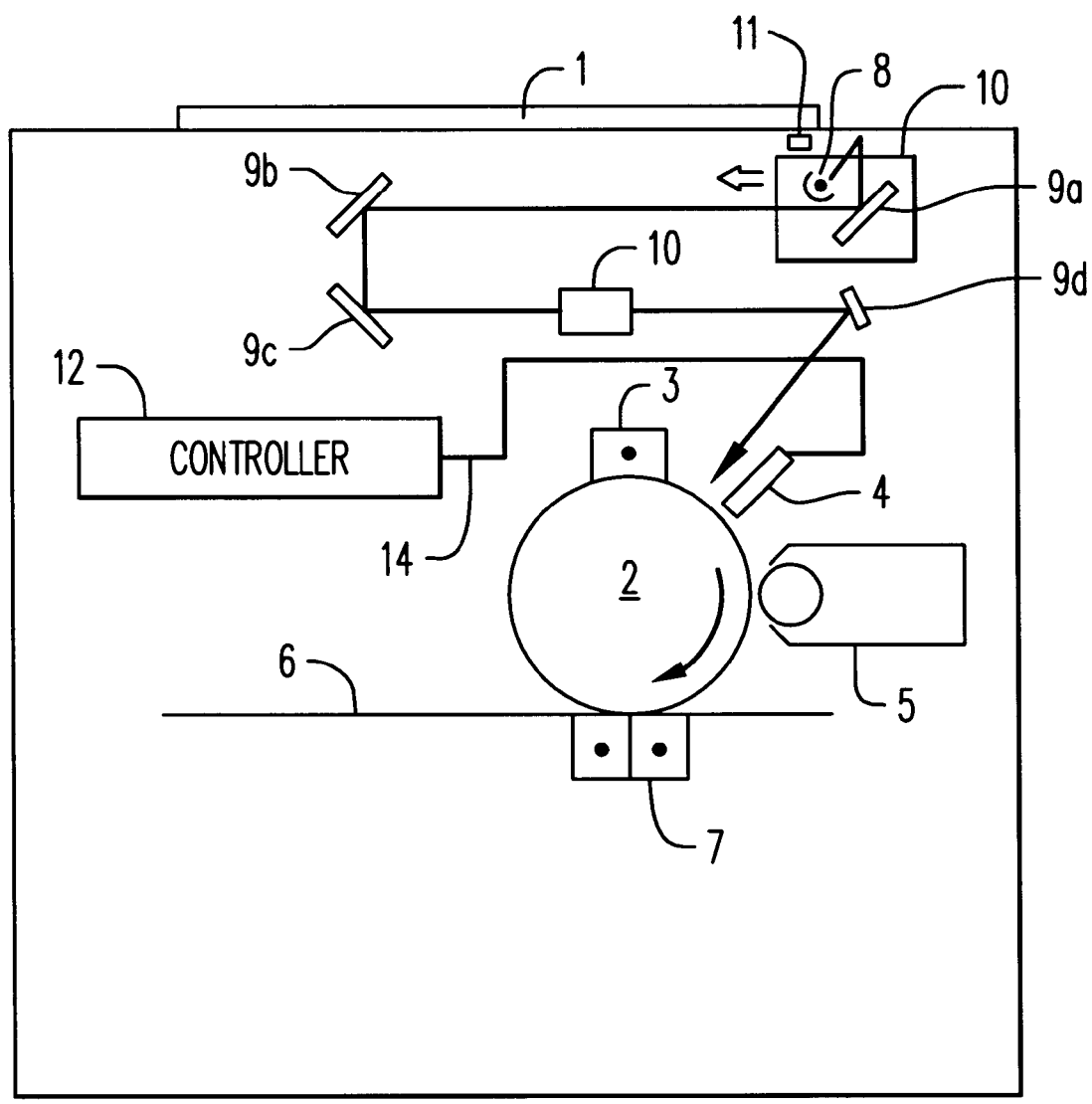
FIG. 1 is a schematic sectional view of a copying machine including an LED eraser unit.

Referring now to the drawings, wherein like reference characters designate like or corresponding parts throughout them, embodiments of the invention are explained. FIG. 1 shows a copying machine including a multi-bit LED eraser unit 4 controlled by a controller 12. A light is reflected from a document placed on a platen by exposing it with an exposure lamp 8 provided in a scanner 10. Then, it is reflected by mirrors 9a, 9b, 9c, passes through a lens 10 and is reflected again by a mirror 9d. The light is focussed onto a photoconductor drum 2. The scanner 10 moves in synchronization with the rotation of the drum 2. A sensor 11 is set at a position to detect when the scanner 10 arrives at a top position of the document 1. According to the exposure of the light reflected from the document 1, an electrostatic latent image of the document 1 is formed on the photoconductor drum 2 which has been sensitized beforehand by a sensitizing charger 3. Then, the latent image is developed with toners by a development unit 5, and the toner image is transferred onto a paper 6 by a transfer charger 7. The eraser unit 4 is located between the sensitizing charger 3 and the development unit 5 along the rotation direction of the drum 2, after an exposure line on the photoconductor drum 2. The eraser unit 4 erases charges in an area not necessary for printing the latent images by exposing the area with LEDs. The controller 12 sends data and signals through transmission lines 14 to the eraser unit 4.

Figure 2:
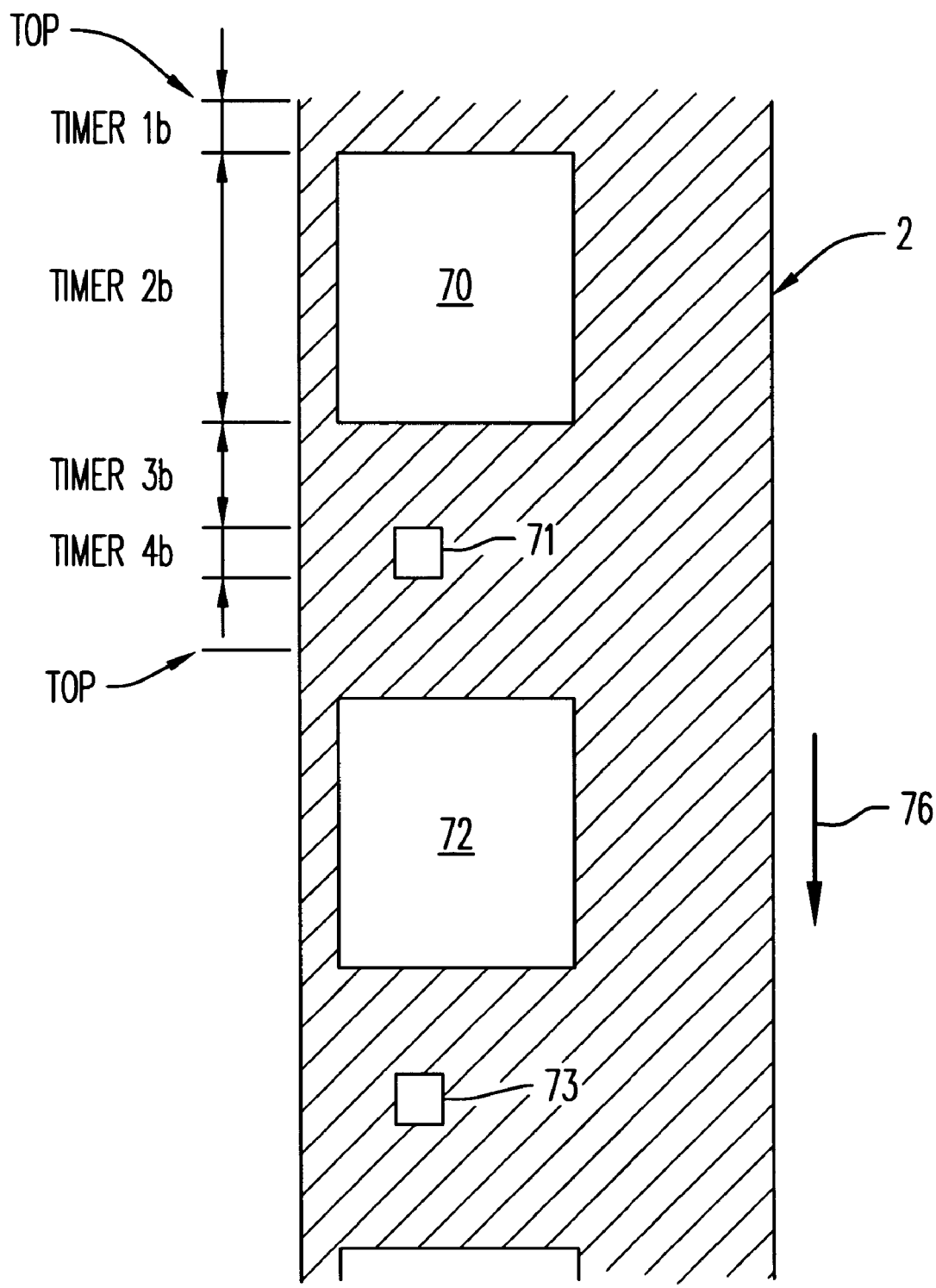
FIG. 2 is a diagram of an example of electrostatic images and automatic image density control patterns formed on the photoconductor drum.

FIG. 2 shows an example of electrostatic latent images 70, 72 and automatic image density control (AIDC) patterns 71, 73 on the photoconductor drum 2 successively by exposure along a rotation direction thereof. The AIDC patterns 71, 73 are formed between latent images 70, 72 for controlling toner density. The area with hatched lines denotes an area which has to be erased by the eraser unit 4. The reference signs such as "timer 1b" are explained later with reference to the control of the eraser unit 4.

Figure 3:
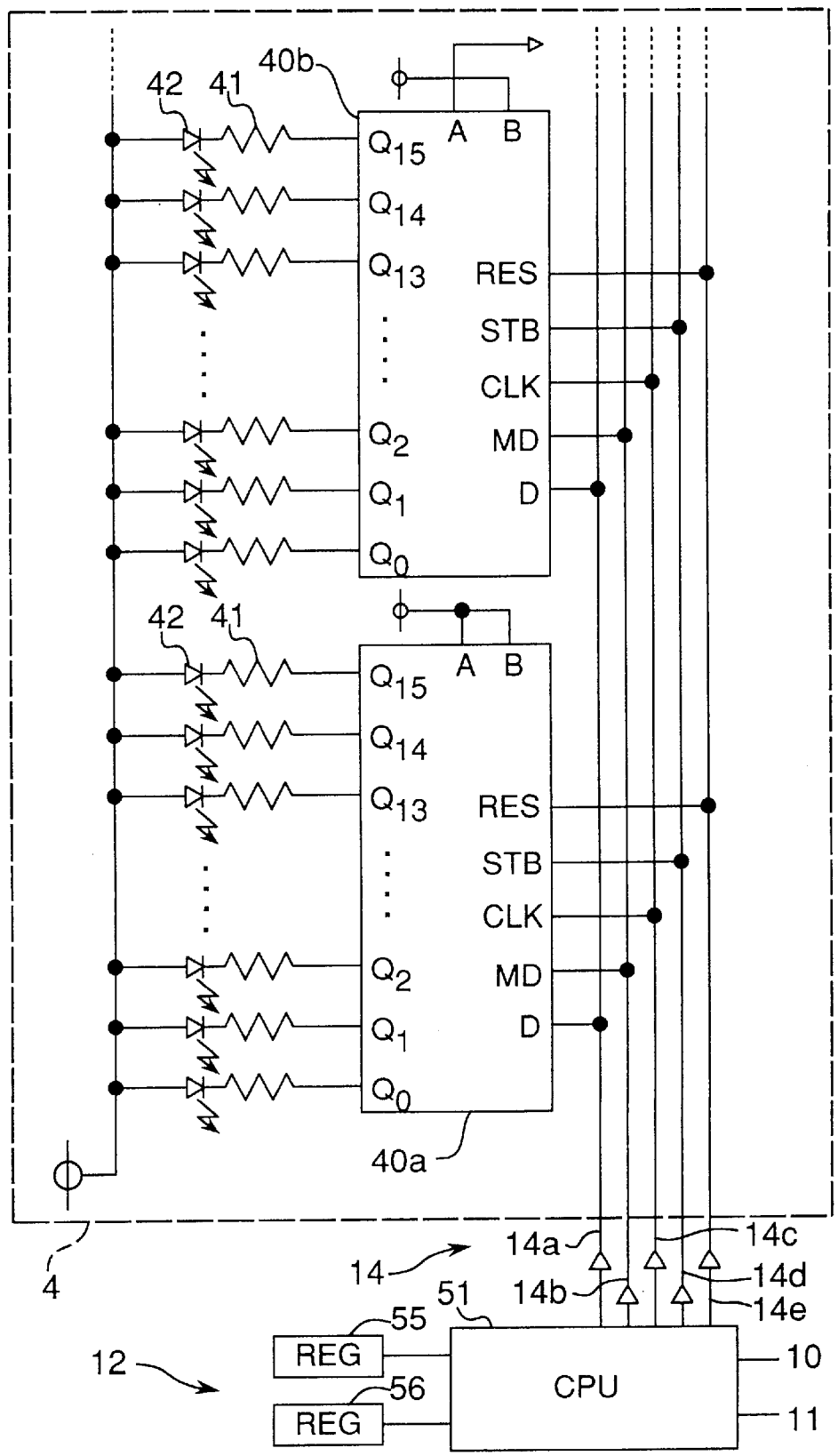
FIG. 3 is a circuit diagram of a part of the LED eraser unit.

FIG. 3 shows the controller 12 and a part of the LED eraser unit 4. The eraser unit 4 has sixty four light emitting diodes (LEDs) 42 aligned linearly along the width direction or main scan direction of the photoconductor drum 2. The eraser unit 4 includes four driver elements 40a, 40b, 40c and 40d, but only two 40a and 40b are shown in FIG. 3 for the ease of explanation. Each driver element 40a, 40b, 40c, 40d has outputs $Q_0$–$Q_{15}$ connected to sixteen LEDs 42 through resistors 41 for limiting a current. Each driver element 40a, 40b, 40c, 40d has the same structure except addresses assigned thereto with address inputs "A" and "B". The driver element 40a has an address of "11", while the driver element 40b has an address of "10". The other two driver elements 40c and 40d not shown have addresses of "01" and "00".

A controller 12 which controls the eraser unit 4 has a central processing unit 51 and registers 55 and 56 for storing pattern data for exposure of the LEDs 42. The LEDs 42 expose the photoconductor drum 2 according a exposure pattern which changes in synchronization with the rotation of the photoconductor drum 2. The controller 12 supplies a serial data signal "D" of the pattern data, a mode signal "MD", a clock signal "CLK", a strobe signal "STB" and a reset signal "RES" to the driver elements 40a, 40b, 40c and 40d through transmission lines 14a, 14b, 14c, 14d and 14e. The controller 12 sends the data "D" serially to the four driver elements 40a, 40b, 40c and 40d, and each of the driver elements selects sixteen data therefor according to an address "A", "B" designated by the controller 12 and latches it as a 16-bit parallel data.

Next, the exposure pattern of the eraser unit controlled by the controller 12 is explained with reference to FIG. 2. When a latent image is formed on the photoconductor drum 2 rotated along a direction 76, all LEDs 42 are turned on along the width direction to erase the surface of the drum 2 until a timer "1b" completes counting. Then, LEDs 42 for a region outside a region for forming the image 70 are only turned to erase the surface of the drum 2 on until a timer "2b" completes counting. Next, all the LEDs 42 are turned on again until a timer "3b" completes counting. Then, LEDs 42 for a region outside a region for forming the AIDC pattern 71 are only turned on until a timer "2b" completes counting. Next, all the LEDs 42 are turned on again until the drum 2 rotates to a top position of the scanner 10 used for next exposure. The control of the LEDs 42 are repeated for another latent image 72 and another AIDC pattern 73.

As explained above, the LEDs 42 are controlled for forming each latent image by supplying appropriate pattern data to the four driver elements 40a, 40b, 40c and 40d. The controller 12 determines the count values of the timers "1b"–"4b" and exposure pattern data to control the emission of the LEDs 42 according to a size of a document, multiplication for copying and the like.

The controller 12 is controlled by a central processing unit 54 and has two registers 55 and 56. As shown in FIGS. 4 and 5, the registers 55 and 56 store data $D_{63}$-$D_0$ and $DB_{63}$-$DB_0$ for the sixty four LEDs 42, respectively. The data $DB_{63}$-$DB_0$ are inverted values of the data $D_{63}$-$D_0$. The data $D_{15}$-$D_0$ and $DB_{15}$-$DB_0$ are supplied to the driver element 40a, the data $D_{31}$-$D_{16}$ and $DB_{31}$-$DB_{16}$ are supplied to the driver element 40b, and so on through the transmission line 14a, while designating address "A" and "B".

Figure 6:
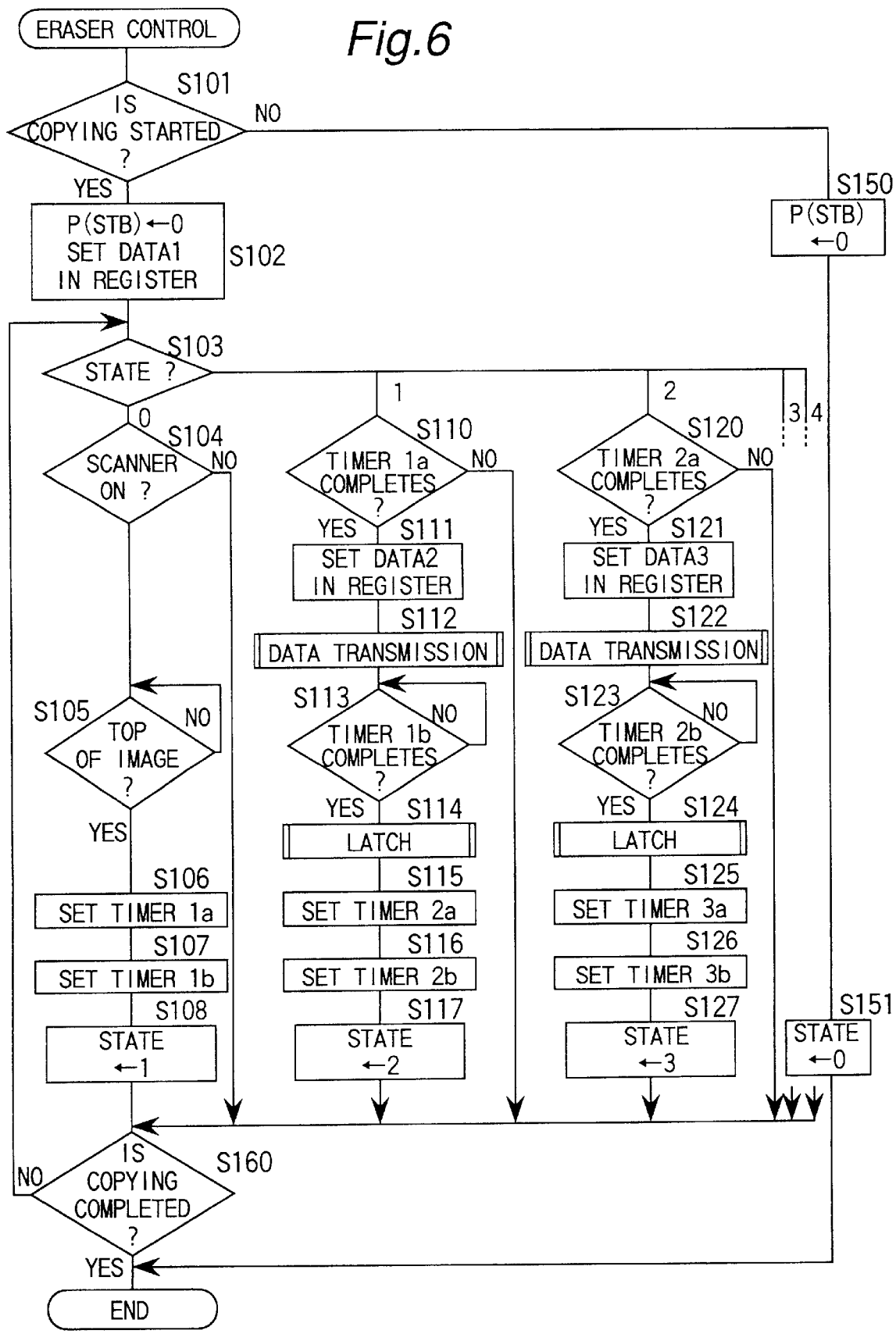
FIG. 6 is a flowchart of eraser control.

FIG. 6 shows a main routine of the above-mentioned erasing control of the CPU 51 of the controller 12. First, it is checked if copy operation is started or not (step S101). If copy operation is decided not to be started (NO at step S101), a strobe signal P(STB) to be sent to the STB pins of the driver elements 40a–40d is set at "1" to turn off all the LEDs 42 in the eraser unit 4 (step S150). Then, a parameter STATE is set at "0" (step S151), and the flow proceeds to step S160.

If copy operation is decided to be started (YES at step S101), a strobe signal P(STB) to be sent to the STB pins of the driver elements is set at "0" to allow all the LEDs 42 to turn on in the eraser unit 4 (step S102). Further, a pattern data DATA1 is set in the register 55 as data $D_{63}$-$D_0$ for turning on all the LEDs 42 and the inverted data thereof is set in the register 56 as data $DB_{63}$-$DB_0$.

Then, the flow branches according to STATE at step S103. Just after the start of copying operation, STATE=0. Then, the flow proceeds to step S104 to decide if the scanner 10 is operated. If the scanner 10 is decided not to be operated (No at step S104), the flow proceeds readily to step S160. If the scanner 10 is decided to be operated (YES at step S104), the scanner 10 is waited to become ready or to arrive to a top position of the document 1 (step S105). When the scanner 10 becomes ready (YES at step S105), the timers "1*a*" and "1*b*" are set (steps S106 and S107). The timer "1*a*" is used to set a timing to start transmission of serial data (refer step S110), and the timing is selected to have a sufficient margin until a timing of latching after the data transmission. Similar times are set in timers "2*a*", "3*a*" and "4*a*" as explained later. On the other hand, the other timer "1*b*" is used to set a timing to latch the transmitted exposure pattern for the LEDs 42 (refer step S114). Similar times are set in timers "2*b*", "3*b*" and "4*b*" as explained later. Then, STATE is set as "1" (step S108), and the flow proceeds to step S160. Then, because the copying operation is decided not to be completed at this time (NO at step S160), the flow returns to step S103.

If STATE=1 at step S103, the flow proceeds to step S110 to decide if the timer "1*a*" completes counting or not. If the timer "1*a*" is decided not to complete counting (NO at step S110), the flow proceeds readily to step S160. If the timer "1*a*" is decided to be completed (YES at step S110), a pattern data DATA2 is set in the register 55 as data $D_{63}$-$D_0$ for turning on the LEDs 42 outside the area 70 (FIG. 2) and the inverted data thereof is set in the register 56 as data $DB_{63}$-$DB_0$ (step S111). Then, the data DATA2 is sent serially to the driver elements 40*a*–40*d* (step S112). Then, after the timer "1*b*" is waited to complete counting (step S113), a value of mode signal "MD" is changed from "1" to "0" for latching the data in the driver elements 40*a*–40*d* (step S114). Next, the timers "2*a*" and "2*b*" are set (steps S115 and S116). The timer "2*a*" is used to set a timing to start transmission of serial data (refer step S115), and the timing is selected to have a sufficient margin until a timing of latching after the data transmission. On the other hand, the other timer "2*b*" is used to set a timing to latch the transmitted exposure pattern for the LEDs 42 (refer step S124). Then, STATE is set as "2" (step S117), and the flow proceeds to step S160. Because the copying operation is decided not to be completed this time (NO at step S160), the flow returns to step S103.

If STATE=2 at step S103, the flow proceeds to step S120 to decide if the timer "2*a*" completes counting or not. If the timer "2*a*" is decided not to complete counting (NO at step S120), the flow proceeds readily to step S160. If the timer "2*a*" is decided to be completed (YES at step S120), a pattern data DATA3 is set in the register 55 as data $D_{63}$-$D_0$ for turning on all the LEDs 42 and the inverted data thereof is set in the register 56 as data $DB_{63}$-$DB_0$ (step S121). Then, the data DATA3 is sent serially to the driver elements 40*a*–40*d* step S122). Then, after the timer "1*b*" is waited to be completed (step S123), and a value of mode signal "MD" is changed from "1" to "0" for latching the data in the driver elements (step S124). Next, the timers "2*a*" and "2*b*" are set (steps S125 and S126). Then, STATE is set as "3" (step S127), and the flow proceeds to step S160. Because the copying operation is decided not to be completed this time (NO at step S160), the flow returns to step S103.

Similarly, if STATE=4, a pattern data DATA4 is set for turning on the LEDs 42 outside the area 71 (FIG. 2), while if STATE=5, a pattern data DATA5 is set for turning on all the LEDs 71.

Figure 7:
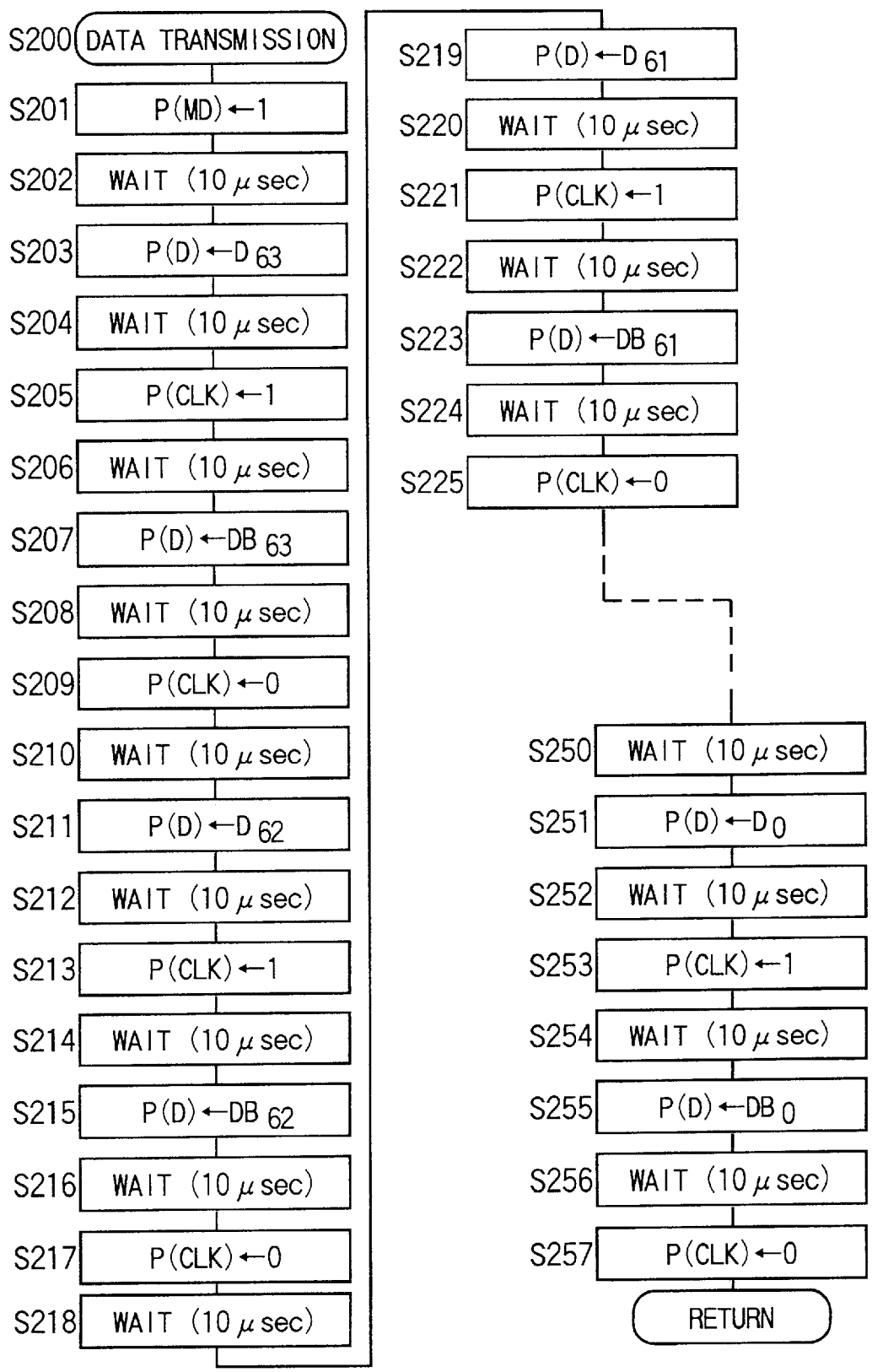
FIG. 7 is a flowchart of data transmission.
Figure 8:
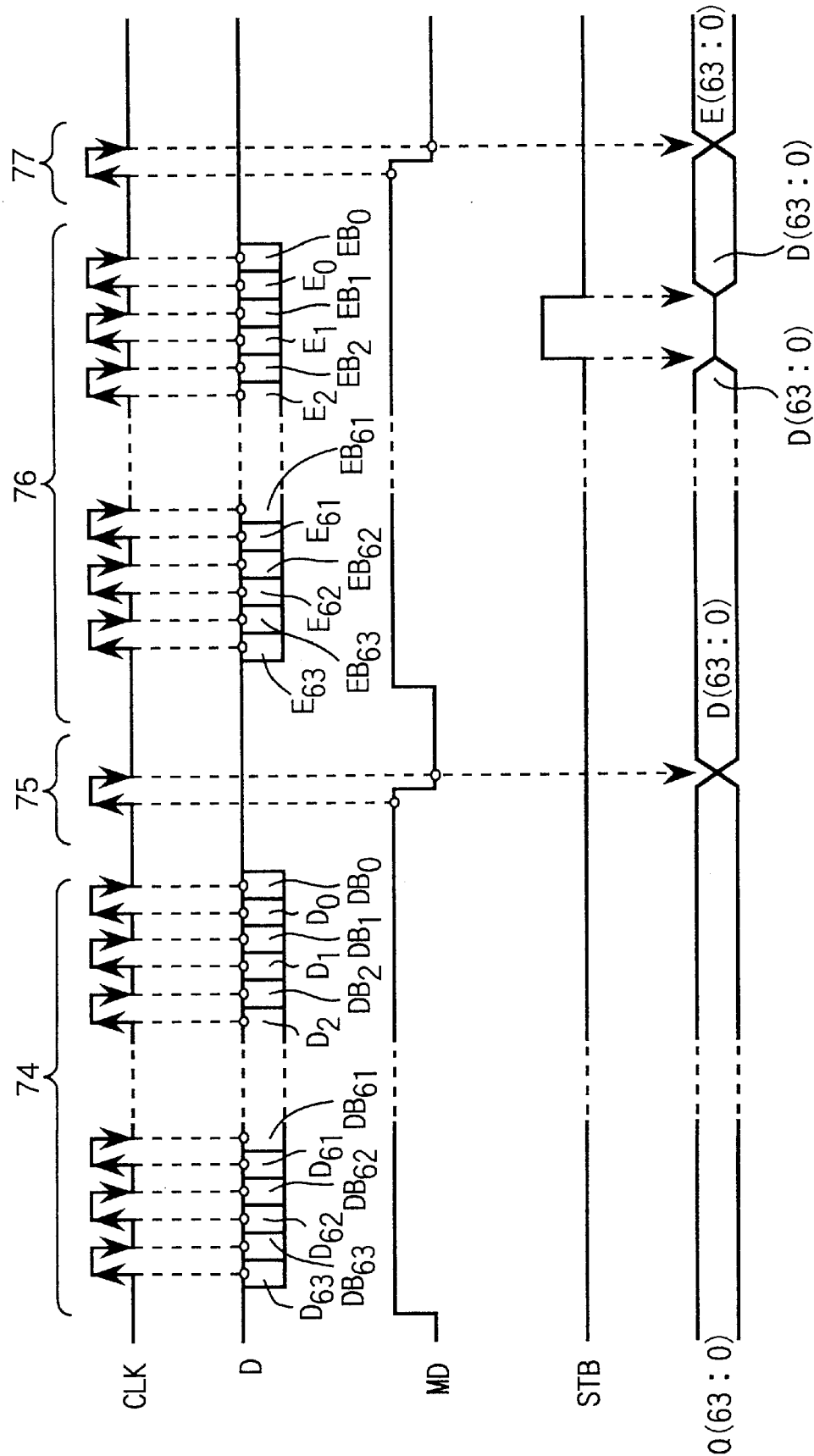
FIG. 8 is a timing chart of data transmission.

FIG. 7 shows a flow of the data transmission (steps S112, S122 and the like in FIG. 6), while FIG. 8 shows a timing chart of the data transmission. First, a mode signal P(MD) to be sent to the MD pin is set at "1" (step S201) to prevent latching of exposure data.

After 10 μsec passes (step S202), a data $D_{63}$ stored in the register 55 is sent to the driver elements 40*a*–40*d* (step S203). After 10 μsec passes further (step S204), a clock signal P(CLK) is set to be "1" (step S205). After 10 μsec passes further (step S206), a data $DB_{63}$ stored in the register 56 is sent to the driver elements (step S207). After 10 μsec passes further (step S208), a clock signal P(CLK) is set to be "0" (step S209). Thus, a pair of data $D_{63}$ and $DB_{63}$ is transmitted.

After 10 μsec passes further (step S210), a data $D_{62}$ stored in the register 55 is sent to the driver elements (step S211). After 10 μsec passes further (step S212), a clock signal P(CLK) is set to be "1" (step S213). After 10 μsec passes further (step S214), a data $DB_{62}$ stored in the register 56 is sent to the driver elements (step S215). After 10 μsec passes further (step S216), a clock signal P(CLK) is set to be "0" (step S217). Thus, a pair of data $D_{62}$ and $DB_{62}$ is transmitted.

After 10 μsec passes further (step S218), a data $D_{61}$ stored in the register 55 is sent to the driver elements (step S219). After 10 μsec passes further (step S220), a clock signal P(CLK) is set to be "1" (step S221). After 10 μsec passes further (step S222), a data $DB_{61}$ stored in the register 56 is sent to the driver elements (step S223). After 10 μsec passes further (step S224), a clock signal P(CLK) is set to be "0" (step S225). Thus, a pair of data $D_{61}$ and $DB_{61}$ is transmitted. Similarly, data $D_{60}$ and $DB_{60}$ to $D_1$ and $DB_1$ are sent to the driver elements.

Then, after 10 μsec passes further (step S250), a data $D_0$ stored in the register 55 is sent to the driver elements (step S251). After 10 μsec passes further (step S252), a clock signal P(CLK) is set to be "1" (step S253). After 10 μsec passes further (step S254), a data $DB_0$ stored in the register 56 is sent to the driver elements (step S255). After 10 μsec passes further (step S256), a clock signal P(CLK) is set to be "0" (step S257). Then, the flow returns to the main flow. Thus, a pair of data $D_0$ and $DB_0$ is transmitted.

Figure 9:
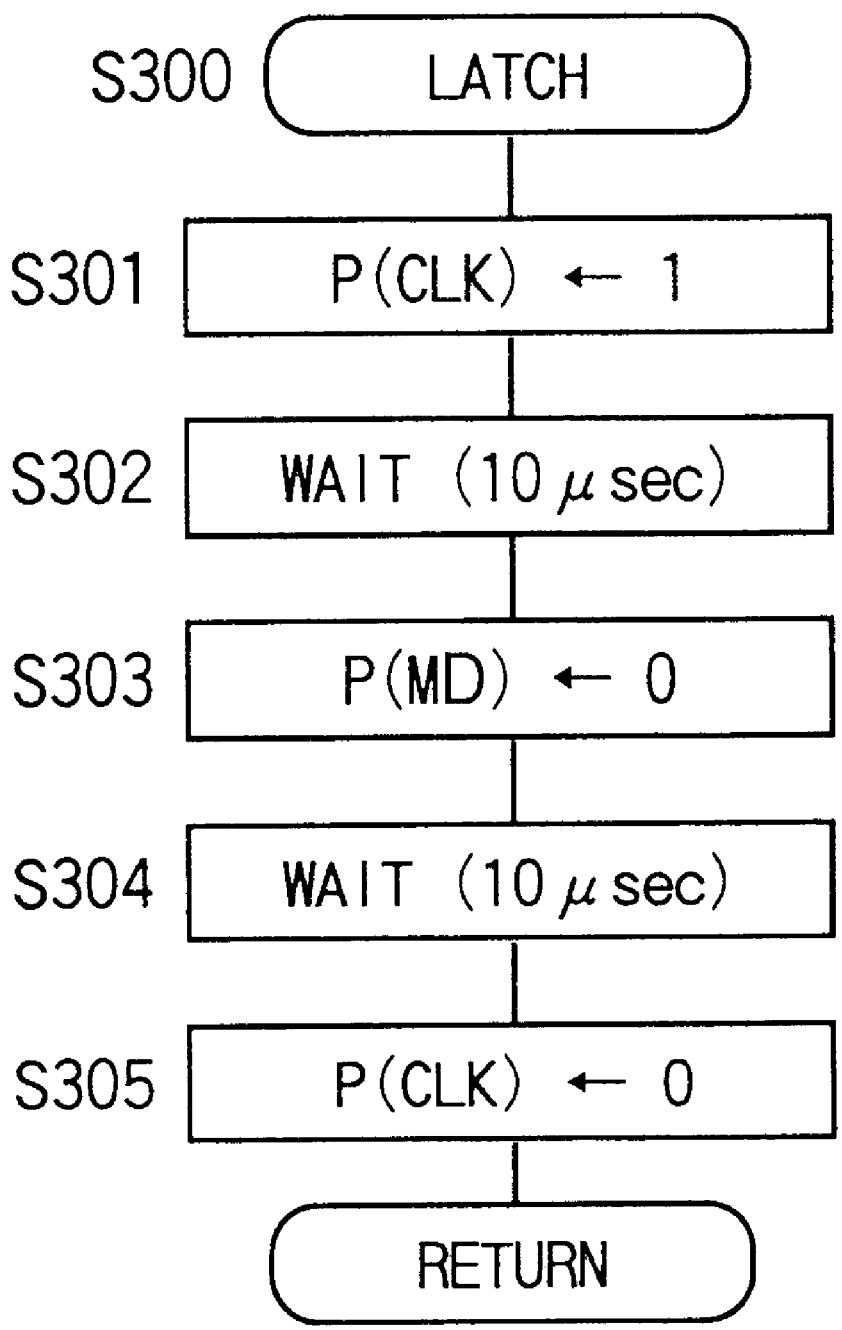
FIG. 9 is a flowchart of latching.

FIG. 9 shows a flow of the latching (steps S114, S124 and the like) for generating a latch signal for latching the 16-bit serial data in the four driving units as driver outputs $Q_0$–$Q_{15}$. First, as shown in a period 75 in FIG. 8, clock signal P(CLK) is set as "1" first (step S301). After 10 μm passes (step S302), mode signal P(MD) is set as "0" (step S303). After 10 μm passes further (step S304), clock signal P(CLK) is set as "0" (step S305). Then, the flow returns to the main flow. The latching is also explained later with reference to a noise canceler block 311.

Figure 10:
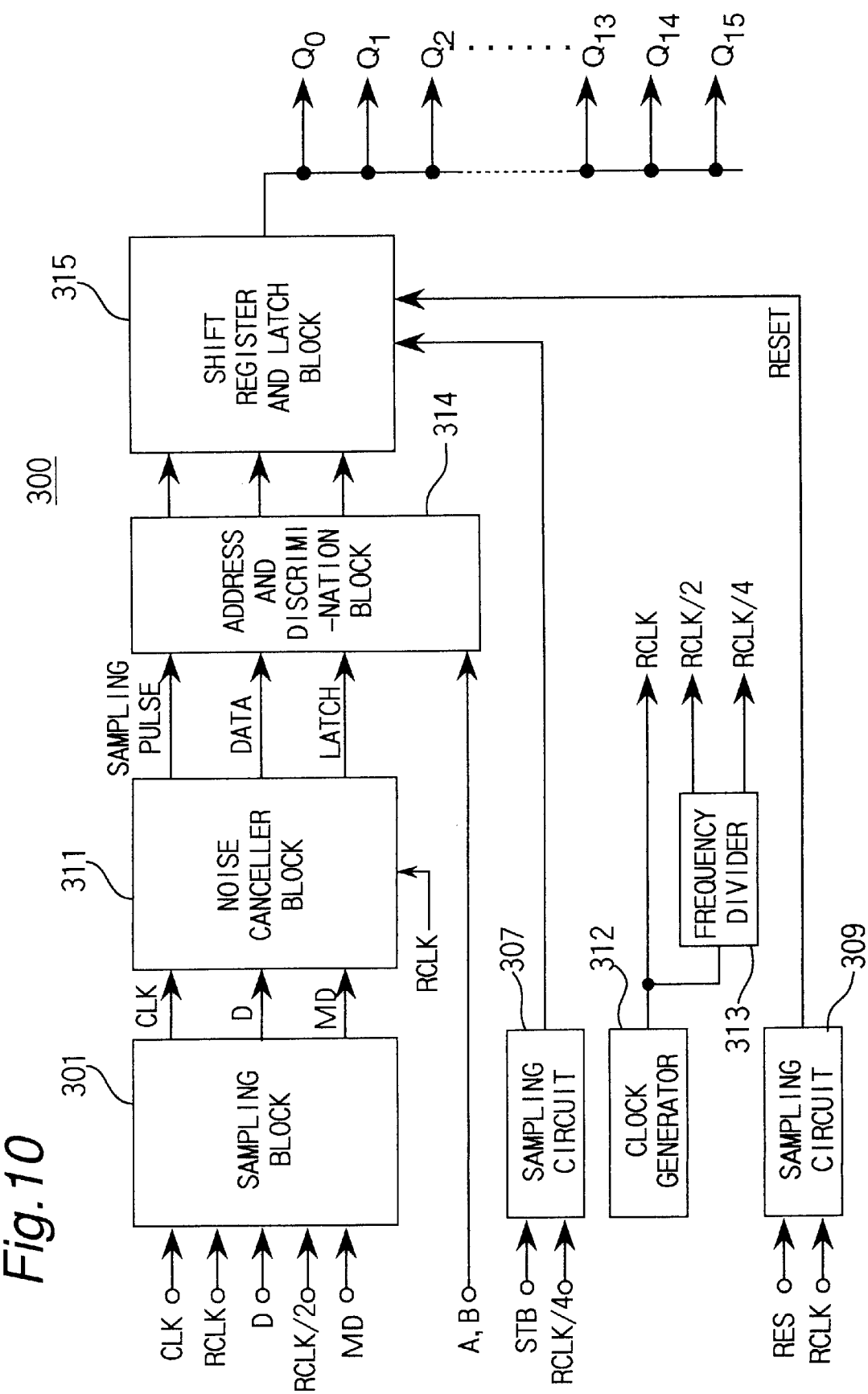
FIG. 10 is a block diagram of a driver element.
Figure 11:
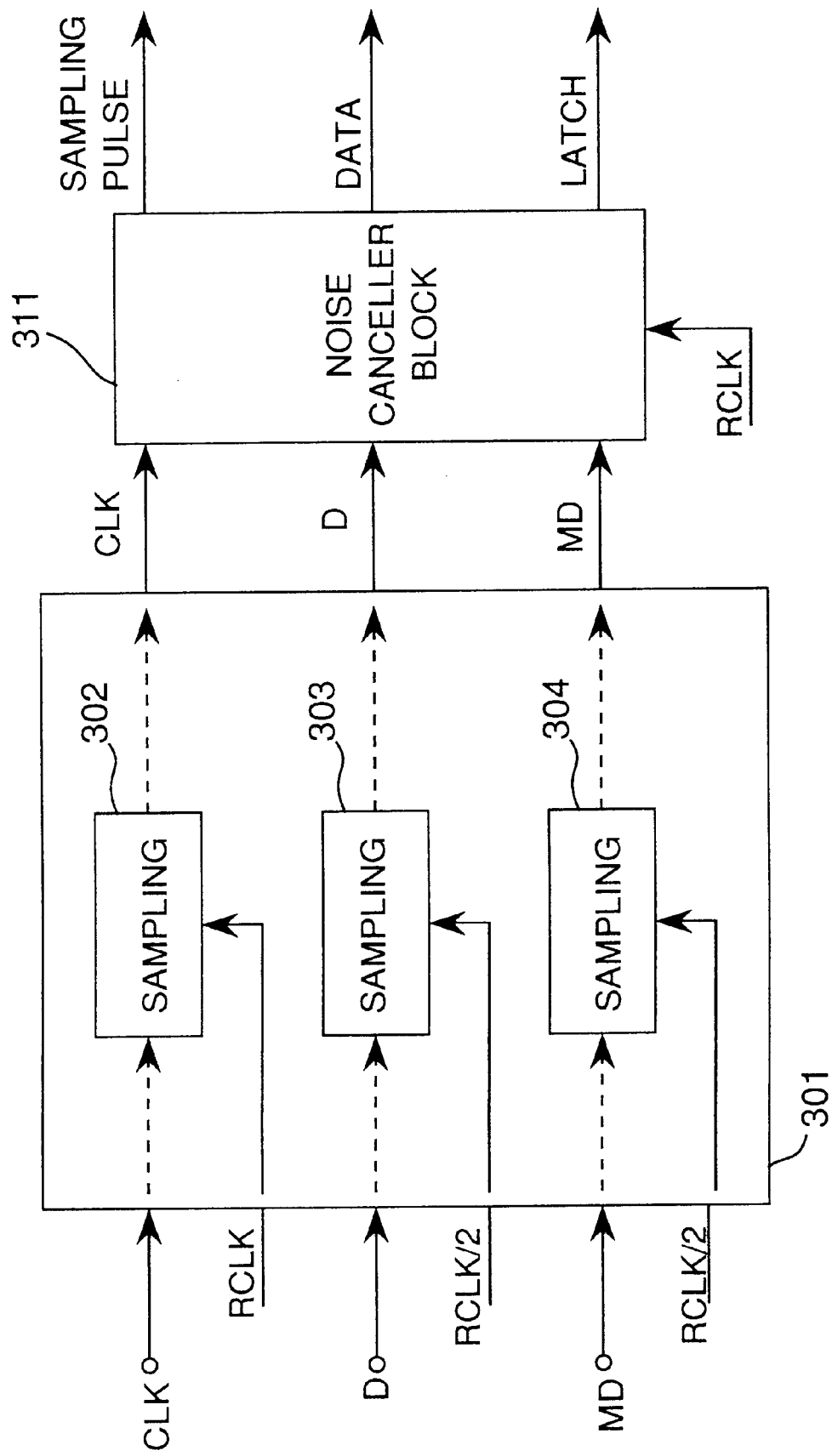
FIG. 11 is a block diagram of a sampling block.
Figure 12:
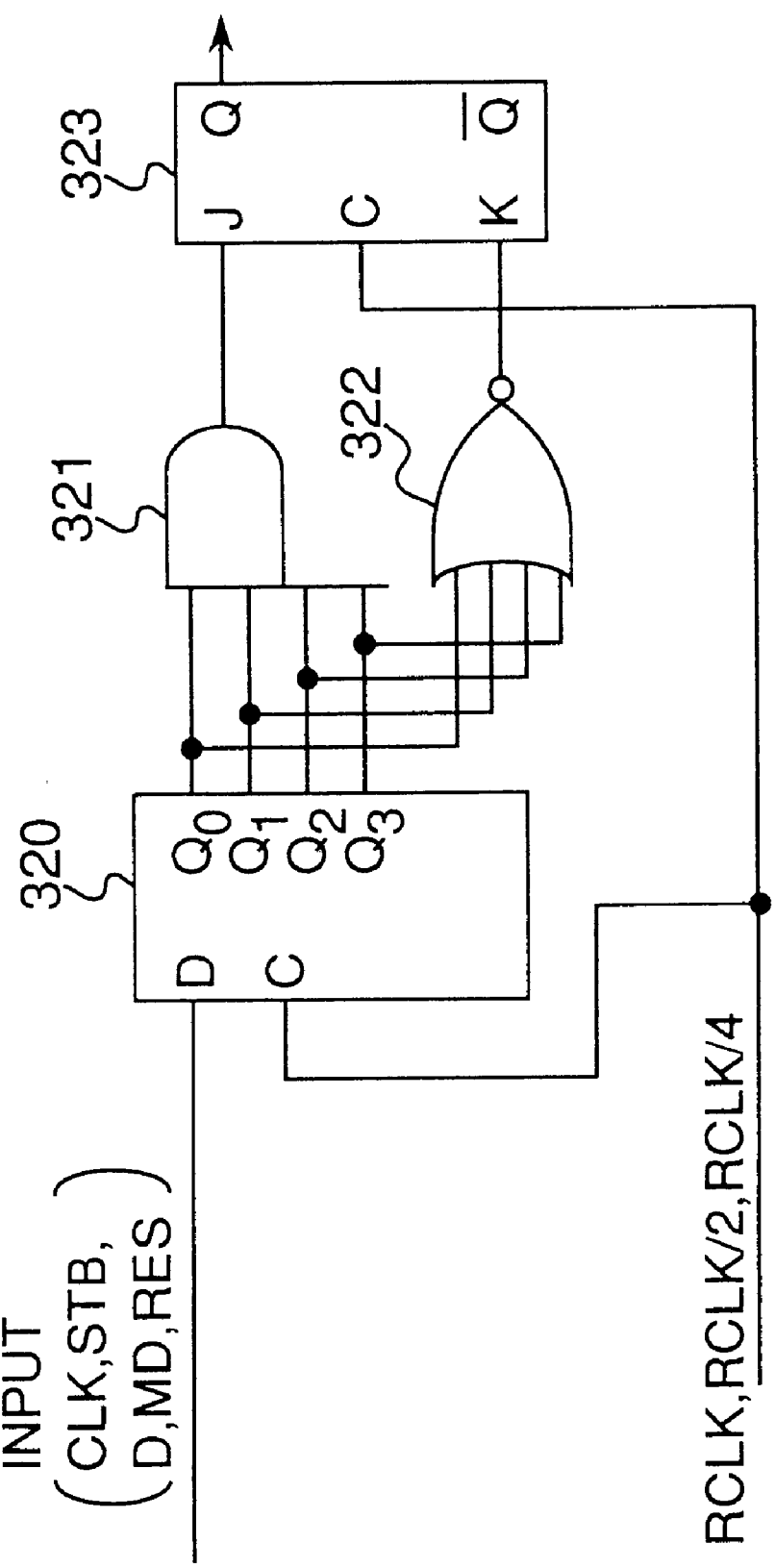
FIG. 12 is a block diagram of a noise canceler circuit.

FIG. 10 shows a block diagram of the driver element 40*a* which is the same as the other drive units. A sampling block 301 receives a clock signal (CLK), a data (D), a mode signal (MD) and reference clock signals (RCLK, RCLK/2, RCLK/4). A reference clock generator 312 generates the reference clock signal RCLK, and a frequency divider circuit 313 generates reference clock signals RCLK/2 and RCLK/4 obtained from the reference clock signal RCLK by dividing it by 2 and 4, respectively. The periods of the reference clock signals, RCLK, RCLK/2 and RCLK/4 are for example 5–10 kHz, much shorter than the clock signal CLK of 20–25 MHz. That is, a period of the four reference clock signals for discriminating noises is much shorter than a half period of the clock signal CLK which allows data transmission of the data D. As will be explained later in detail (FIG. 11), the sampling block 301 samples the input signals at the leading edge of the reference clock signals RCLK, RCLK/2, RCLK/4 during four cycles repeatedly, and it sends them to a noise canceler block 311 to decide if the four data are the same. If the four successive data are not the same, the data are decided to be noises. Thus, the noise canceler block 311 can remove noises having a width which cannot be removed by the sampling block 301. The noise canceler block 311 will be explained later in detail (FIG. 12).

A sampling pulse, a data signal and a latch signal are sent as effective signals and data by the noise canceler block 311 to an address and discrimination circuit 314. The circuit 14 decides if the receive signals are to be received by the driver element according to the address A, B assigned for each driver element. If the receive signals are decided to be sent for the driver element, the signals are sent to a shift register and latch block 315, otherwise they are made ineffective. The shift register and latch block 315 sends a 16-bit parallel data as parallel driver outputs $Q_0$–$Q_{15}$ for the LEDs 42 when the latch signal is received.

The controller 12 sends a reset signal RES to each driver element when it starts to drive the LED eraser unit 4, and the reset signal RES is sent to the driver elements through a sampling circuit 309 to the shift register and latch block 315. If the strobe signal STB is "1", the shift register and latch block 315 makes the signals $Q_0$–$Q_{15}$ ineffective to turn off all the LEDs.

Next, data processing in the driver element 40a is explained with reference to the timing chart shown in FIG. 8 on input, latch and output of pattern data of, for example, DATA1. As shown in a part 74 in the timing chart, when a mode signal MD is at level "1", the controller 12 sends successively $D_{63}$ in the data DATA1 and $DB_{63}$ stored in the registers 55 and 56 as data D through the transmission line to the sampling block 301 (FIG. 10) in the four driving units. The data $DB_{63}$ is the inverted data of the data $D_{63}$. The sampling block 301 samples data $D_{63}$ at the leading edge of a clock signal CLK just after the output of the data $D_{63}$ and the data $DB_{63}$ at the trailing edge of the clock signal CLK. If a pair of the data $D_{63}$ and $DB_{63}$ is confirmed not to be the same, or one of the pair is the inverted logic data of the other, the data $D_{63}$ is input in the shift register and latch block 315. Next, the controller 12 sends successively $D_{62}$ in the data DATA1 and $DB_{62}$ as data D through transmission lines to the sampling block 301. The sampling block 301 samples data $D_{62}$ at the leading edge of a next clock signal CLK and the data $DB_{62}$ at the trailing edge of the clock signal CLK, and if a pair of the data $D_{62}$ and $DB_{62}$ is confirmed not to be the same, or one data of the pair is the inverted logic data of the other, the data $D_{62}$ is input in the shift register and latch block 315. Similarly, the controller sends data $D_{61}$, $DB_{61}$, $D_{60}$, $DB_{60}$, ..., $D_0$, $DB_0$ successively, and the data $D_{61}$, $D_{60}$, ..., $D_0$ are input in the shift register. Thus, the data DATA1 of $D_{63}$–$D_0$ is latched in the shift register and latch block 315 in the four driver element 40a–40d as $Q_{63}$–$Q_0$ displayed as Q(63:0) in FIG. 8.

Then, as shown in a part 75 in the timing chart, after the data D63-D0 is input, the controller 12 changes mode signal MD from "1" to "0". The noise canceler block 311 (FIG. 10) generates a latch signal when the mode signal MD is "1" at the leading edge of a clock signal CLK and "0" at the trailing edge of the clock signal CLK or when the data in a pair of the above-mentioned timings are confirmed not to be noises. Thus, even if noises are induced in a transmission line for the mode signal MD, it is prevented to update data erroneously. Then, the data $D_{63}$–$D_0$ is latched in the shift register and latch block 315 in the four driver elements to update the outputs $Q_{63}$–$Q_0$.

Next, as shown in a part 76 in the timing chart, when a mode signal MD is at level "1" again, the controller 12 sends successively $D_{63}$, $DB_{63}$, $D_{62}$, $DB_{62}$, ..., $D_0$, $DB_0$ of DATA2 for the driving unit 400 successively through transmission lines to the sampling block 301 in the driver elements 40a–40d similarly to the part 74. (It is to be noted in FIG. 8 that data $D_{63}$-$D_0$ and $DB_{63}$-$DB_0$ for DATA2 are denoted as $E_{63}$-$E_0$ and $EB_{63}$-$EB_0$ in order to discriminate data DATA1 for the ease of explanation.) Thus, the data $D_{63}$, $D_{62}$, ..., $D_0$ are input in the shift register and latch block 315 in the four driving units. Then, as shown in a part 77 in the timing chart, the data $D_{63}$-$D_0$ is latched in the shift register and latch block 315 to update the parallel outputs $Q_{63}$-$Q_0$ in the driving unit 400. The above-mentioned processing is performed similarly when a data such as DATA 3 is supplied to update the outputs $Q_{63}$-$Q_0$.

Next, components in the driver element 40a are explained. As shown in FIG. 11, the sampling block 301 comprises three sampling circuits 302, 303 and 304. The first sampling circuit 302 samples a clock signal CLK at a leading edge of a reference clock signal RCLK. The second and third sampling circuits 303 and 304 sample a data D and a mode signal MD at the leading edge of a reference clock signal RCLK/2 generated by dividing the frequency of the clock RCLK by two by a frequency divider circuit 313 (FIG. 10).

Figure 13:
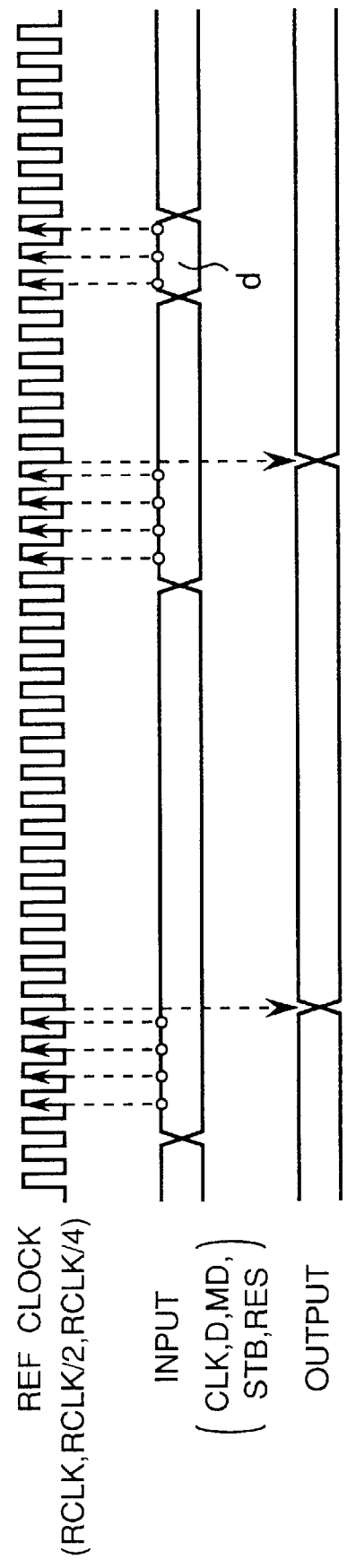
FIG. 13 is a timing chart of the sampling block.

FIG. 12 shows a block diagram of the noise canceler block 311. Sampling is performed during four successive reference clock signals RCLK, RCLK/2, RCLK/4 and 3*RCLK/4, in order to remove noises which are shorter than five reference clock signals. An input signal such as clock signal CLK, data signal D, mode signal MD, strobe signal STB or reset signal RES is input to pin C of a 4-bit shift register 320. The input signal is shifted at leading edges of the reference clock signal RCLK, RCLK/2 or RCLK/4. Four outputs $Q_0$–$Q_3$ are connected to four inputs of an AND gate 321 and those of a NOR gate 322. An output of the AND gate 321 is connected to pin J of a JK flip flop 323, while that of the NOR gate 322 is connected to pin K thereof. A reference clock signal RCLK, RCLK/2 or RCLK/4 is input to pin C of the shift register 320 and to pin C of the JK flip flop 323. In a timing chart shown in FIG. 13, if four data sampled for successive four reference clock signals are the same, the JK flip flop 323 outputs the input data successively. However, if four sampled data change for successive four reference clock signals, the JK flip flop 323 decides that the data are noises and keeps the data before the noises. Therefore, noises shorter than the five successive reference clock signals can be removed.

Figure 14:
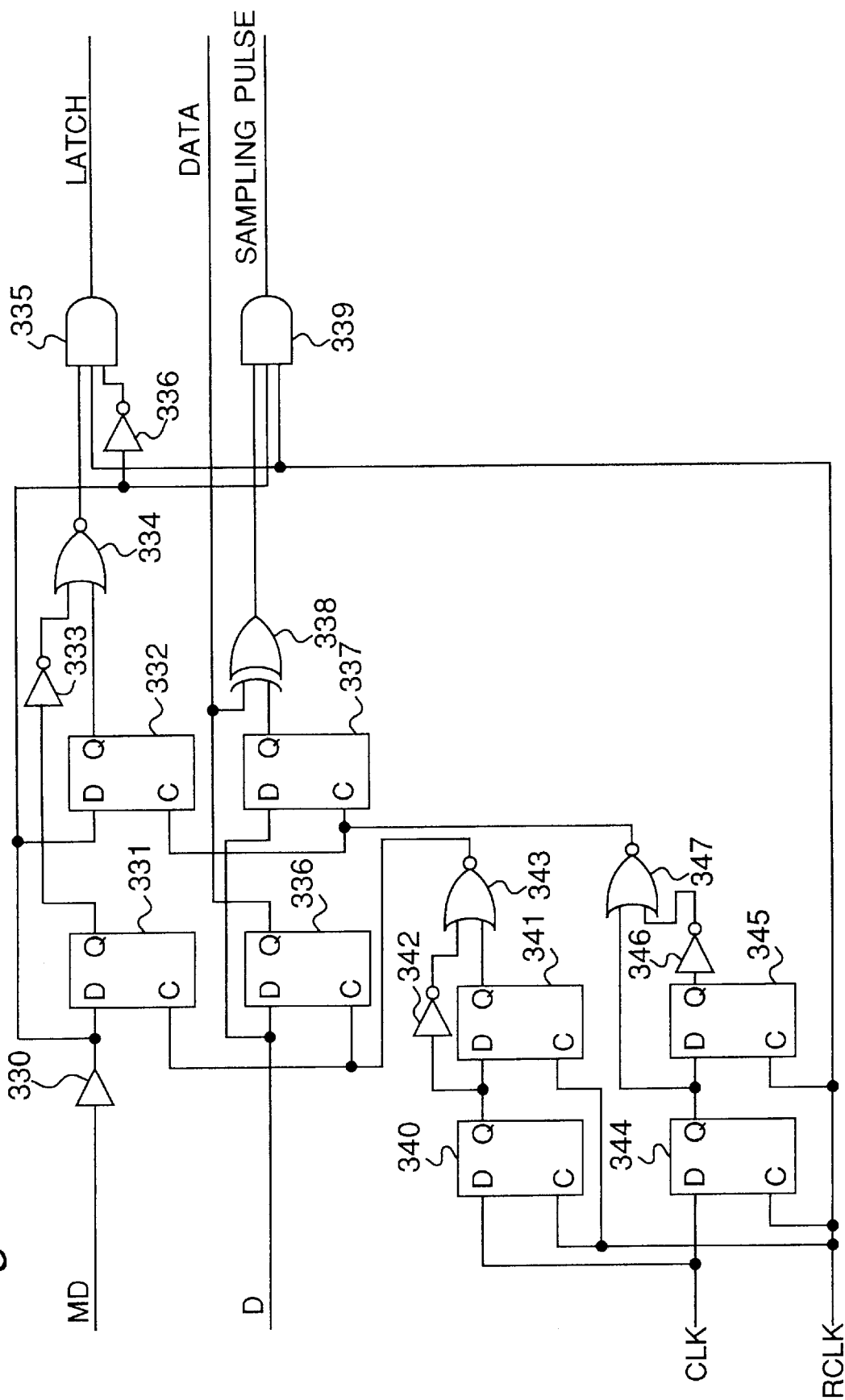
FIG. 14 is a block diagram of the noise canceler block.

FIG. 14 shows the noise canceler block 311 which cancels noises induced in transmission lines of MD, D and CLK without interrupting serial data transmission. A leading edge detection circuit comprises delay circuits 340, 341, an inverter 342 and a NOR gate 344 and it detects a change from "0" to "1" of a clock signal CLK. A clock signal CLK is input to D input of the delay circuit 340, while a reference clock signal RCLK is supplied to C inputs of the delay circuits 340 and 341. The output of the delay circuit 340 is supplied to D input of the other delay circuit 341 and to the inverter 342. The outputs of the inverter 342 and of the delay circuit 341 are supplied to the inputs of the NOR gate 343. The NOR gate 343 supplies "1" when the clock signal CLK changes from "0" to "1" during one reference clock signal RCLK, otherwise it supplies "0".

A trailing edge detection circuit including delay circuits 344, 345, an inverter 346 and a NOR gate 347 detects a change from "1" to "0" of a clock signal CLK. A clock signal CLK is input to D input of the delay circuit 344, while a reference clock signal RCLK is supplied to C inputs of the delay circuits 344 and 345. The output of the delay circuit 344 is supplied to D input of the other delay circuit 345 and to an input of the NOR gate 347. The output of the delay circuit 345 are supplied to the inverter 346, and the output thereof is supplied to the other input of the NOR gate 347. The NOR gate 347 supplies "1" when the clock signal CLK changes from "1" to "0" during one reference clock signal RCLK, otherwise it supplies "0".

Figure 15:
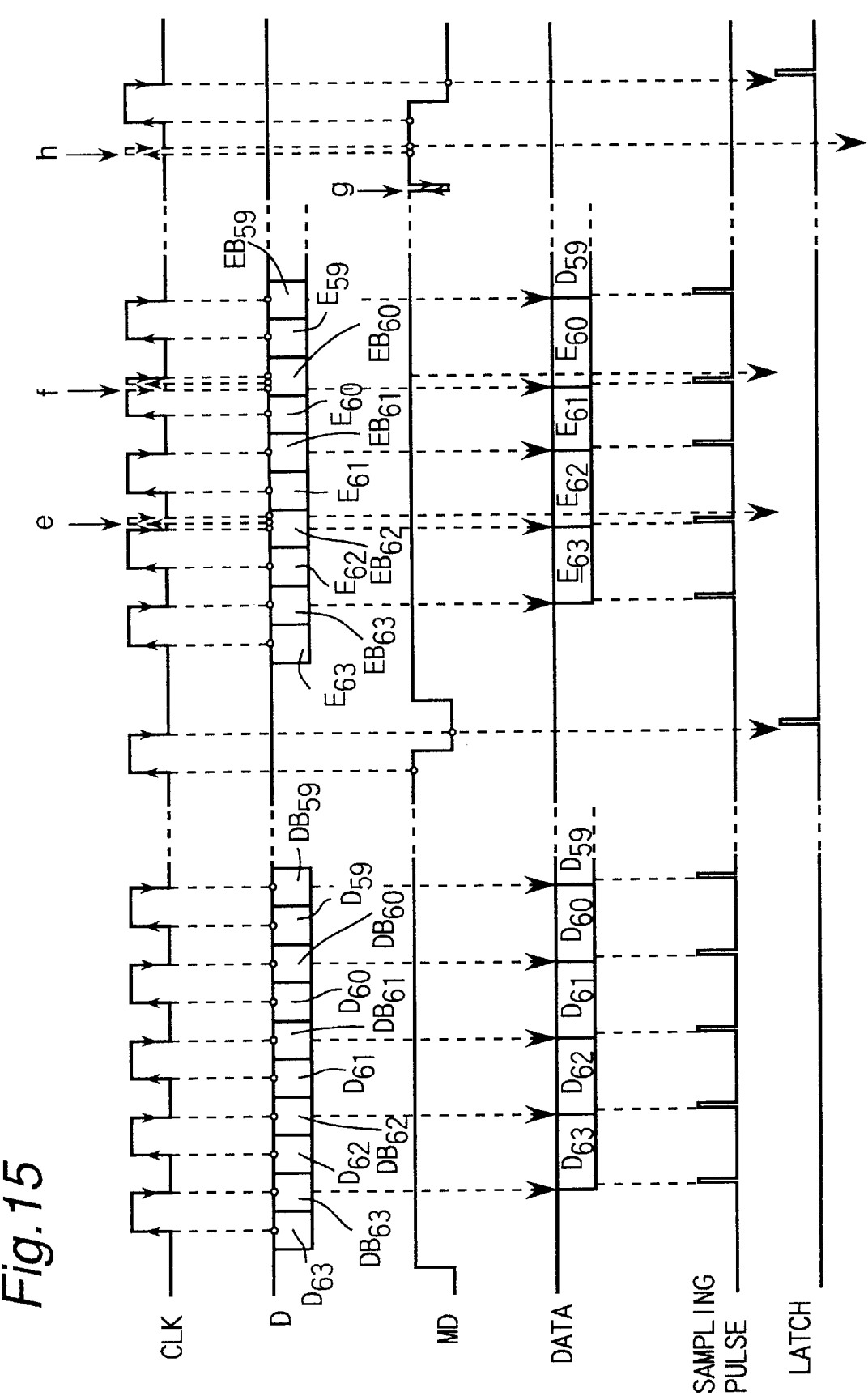
FIG. 15 is a timing chart of data transmission.

An MD discrimination circuit including delay circuits 331, 332, an inverter 333 and a NOR gate 334 detects if the MD signal is "1" at a leading edge of the clock signal CLK and "0" at the trailing edge thereof just after the leading edge. A data MD is input to D inputs of the delay circuits 331 and 332, while a clock signal is supplied from the leading edge detection circuit to C input of the delay circuit 331. The output of the delay circuit 331 is supplied through the inverter 333 to an input of the NOR gate 334. A clock signal is supplied from the trailing edge detection circuit to C input of the delay circuit 332, and the output of the delay circuit 332 is supplied to the other input of the NOR gate 334. Thus, the NOR gate 334 supplies "1" when the MD signal is "1" at a leading edge of the clock signal CLK and "0" at the trailing edge thereof just after the leading edge. As shown in FIG. 15, the NOR gate 334 supplies a signal "0" when noises "g" are induced in the transmission line for the mode signal MD or when noises "h" are induced in the transmission line for the clock signal CLK.

Further, the output of the NOR gate 334 is supplied to a 3-input AND gate 335. The MD signal and the reference clock signal RCLK are also input to the AND gate 335. Therefore, the AND gate 335 supplies a latch signal only when the MD signal is changed from "1" to "0", the mode signal is "0" and the reference clock signal RCLK is "1". In an example shown in FIG. 15, the NOR gate 334 of the MD decision circuit supplies signal "0" when a noise "g" is induced in the transmission line for the mode signal MD or when a noise "h" is induced in the transmission line for the clock signal CLK. Therefore, the noises does not cause a latch signal to be generated. In other words, the noises "g" or "h" do not affect transmission timings of the serial data D.

A data discrimination circuit comprises delay circuits 336, 337 and a EXOR gate 338, and it detects if a data D is true or not. A data D is input to D inputs of the delay circuits 336 and 337, while a clock signal CLK is supplied from the leading edge detection circuit to C input of the delay circuit 336. The output of the delay circuit 336 is supplied to an input of the EXOR gate 338 and is output directly as a data. A clock signal CLK is supplied from the trailing edge detection circuit to C input of the delay circuit 337, and the output of the delay circuit 337 is supplied to the other input of the EXOR gate 338. That is, the EXOR gate 338 receives a first data D when a leading edge of a clock signal is detected and a second data D when the trailing edge thereof is detected. Thus, the EXOR gate 338 supplies "1" when the first and second data D are not equal to each other.

Further, the output of the EXOR gate 338 is supplied to a 3-input AND gate 339. The MD signal and the reference clock signal RCLK are also input to the AND gate 339. Therefore, the AND gate 339 supplies a sampling signal only when the first and second data D are not equal to each other, the mode signal is "0" and the reference clock signal RCLK is "1". In an example shown in FIG. 15, the EXOR gate 338 supplies signal "0" when a noise "e" is induced in the transmission line for the data D of "0" or when a noise "f" is induced in the transmission line for the data D of "1". Therefore, the noises do not cause a sampling signal to be generated. In other words, the noises "e" or "f" reject noises effectively, while not interrupting transmission of the serial data.

In the driver element shown in FIG. 10, the sampling circuit 307 supplied a strobe signal to the shift register and latch block 315 to enable output of the data in the shift register directly. That is, the sampling block 307 samples a strobe signal STB in synchronization with a reference clock signal RCLK/4. As noted in the part 76 in FIG. 8, if a strobe signal STB becomes "1" during the data input of a 16-bit serial data, all the outputs $Q_{63}$-$Q_0$ are not output or becomes ineffective to turn off all the LEDs.

Similarly, the sampling circuit 309 samples a reset signal RES in synchronization with a reference clock signal RCLK. If the strobe signal STB is "1", the shift register and latch block 315 makes the signals $Q_0$-$Q_{15}$ ineffective to turn off all the LEDs.

Figure 16:
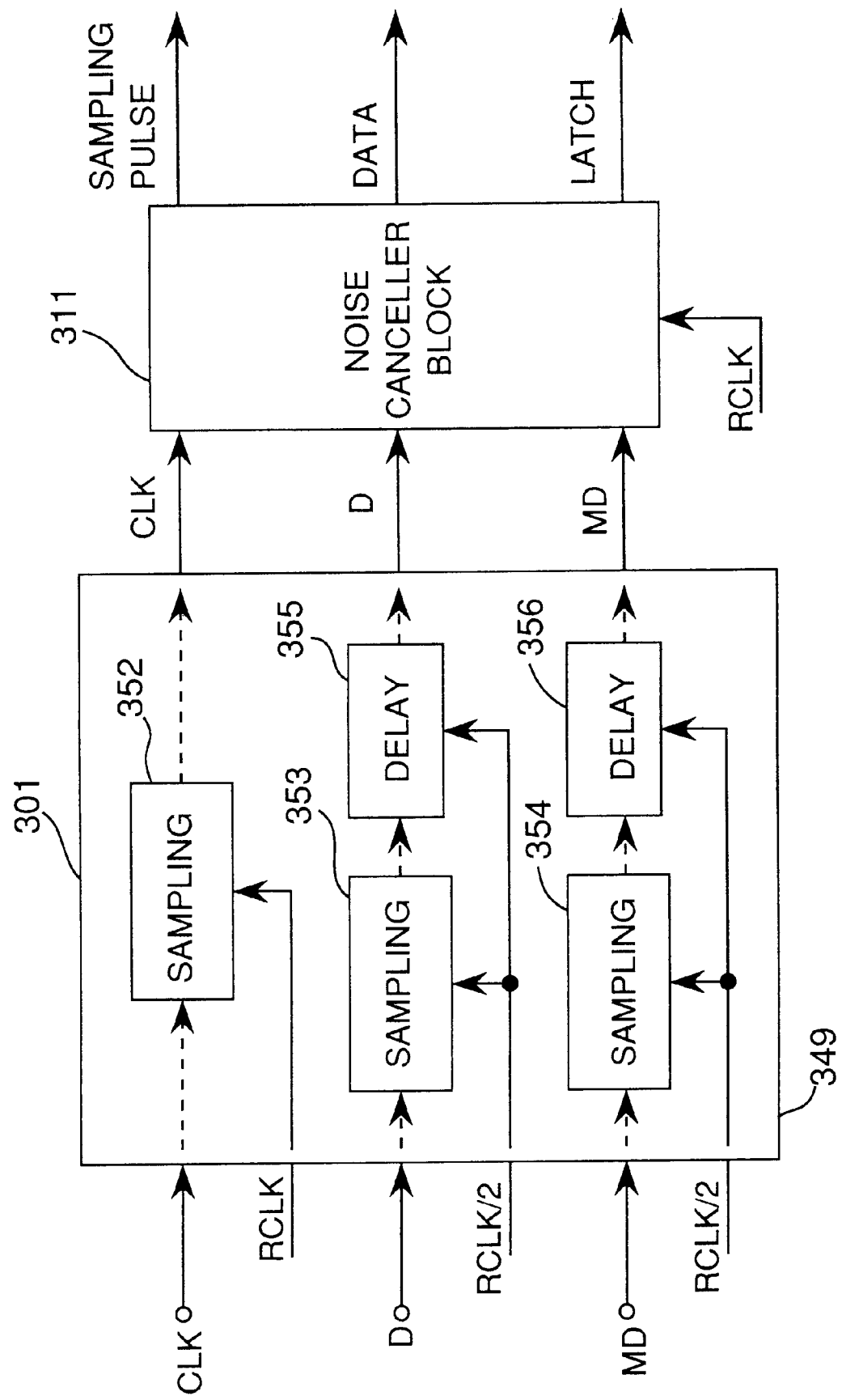
FIG. 16 is a block diagram of another example of the sampling block.
Figure 17:
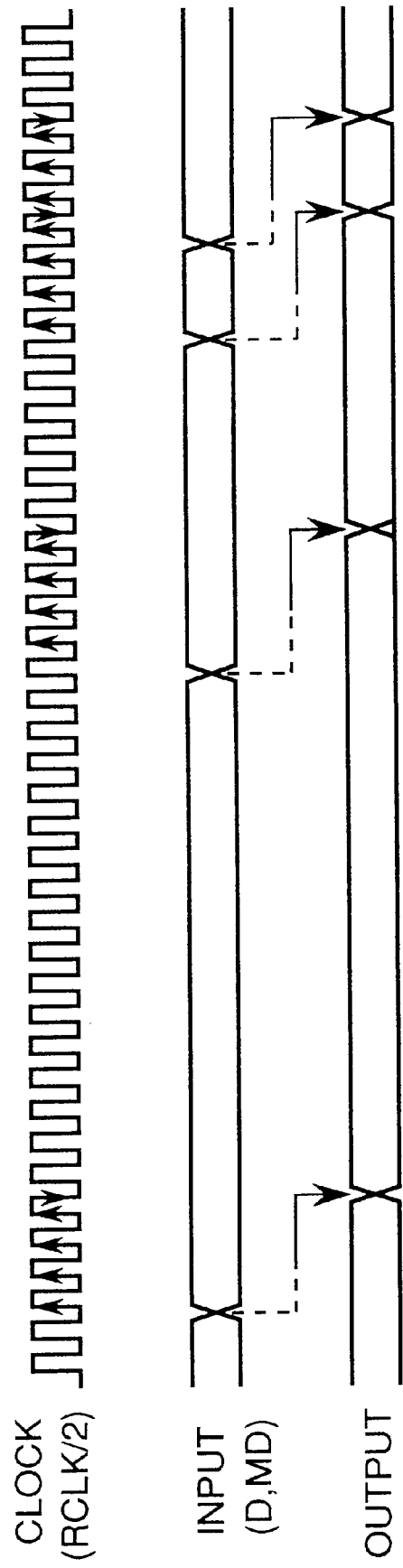
FIG. 17 is a timing chart of the sampling block.

Next, a second example of a sampling block 301 is explained. FIG. 16 shows the sampling block 301 comprising three sampling circuits 352, 353 and 354 and two delay circuits 355 and 356. The first sampling circuit 352 samples a clock signal CLK at a leading edge of a reference clock signal RCLK. The second and third sampling circuits 353 and 354 sample a data D and a mode signal MD at the leading edge of a reference clock signal RCLK/2 generated by dividing the frequency of the clock RCLK by two by the frequency divider circuit 313. The sampling is performed during four successive reference clock signals RCLK, in order to remove noises shorter than five reference clock signals. The data of D and MD sampled by the sampling circuits 353 and 354 are delayed further by delay circuits 355 and 356 by one reference clock signal RCLK/2, as shown in a timing chart in FIG. 17. The delay time of the data D and MD is less than a half cycle of the clock signal CLK or a time which allows for data transmission of the data D.

Transmission lines for the clock signal CLK, the mode signal MD and data D are usually provided near each other in serial data transmission. Therefore, it is liable noises are induced or picked up simultaneously in the transmission lines. In the above-mentioned embodiment using the delay circuits 345 and 346, if noises in the CLK line are erroneously sampled as a true data, they are prevented to synchronize noise data in the D and MD lines. Therefore, noises can be removed more efficiently.

Figure 18:
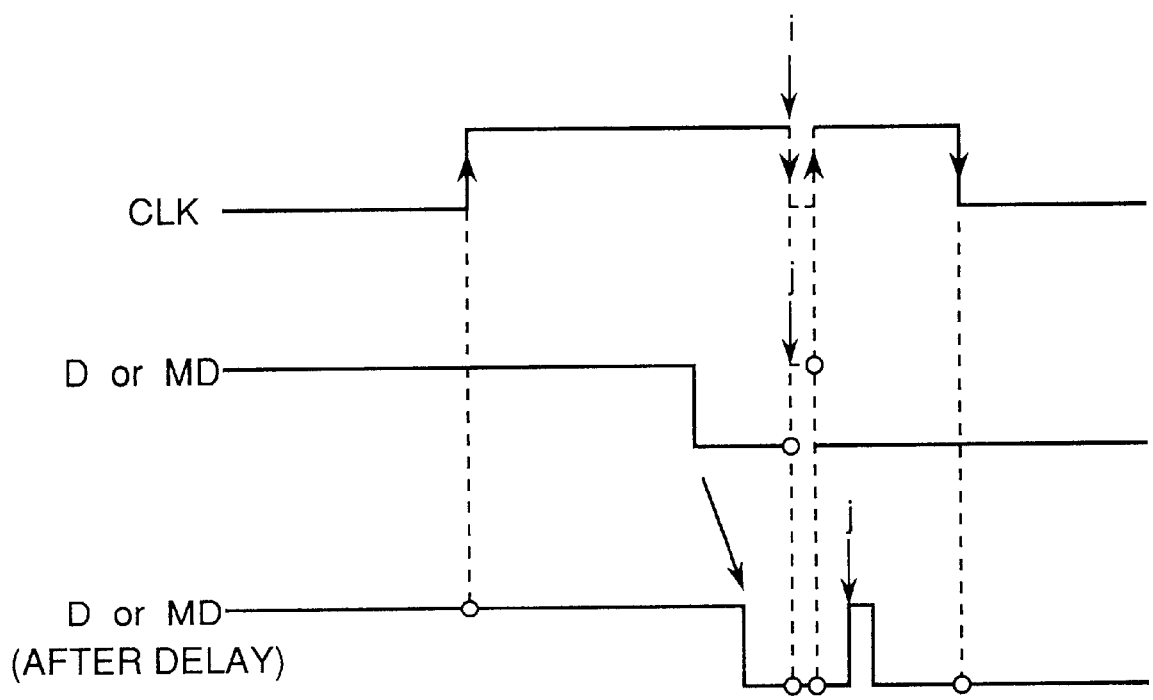
FIG. 18 is a timing chart of clock signal CLK, data D, and mode signal MD.

FIG. 18 shows an example of a timing chart of noise removal. A noise "j" is induced in the clock signal CLK and in the data D or mode signal MD. The latter D or MD is shifted by the delay circuits 355 and 356, and it is "0" at the trailing edge of the clock signal CLK induced by the noise "j". Therefore, the noise "j" are prevented to be decided as a true data.

In the embodiments explained above, noises in the serial data transmission are removed or canceled for an LED eraser unit. However, the noise canceling can also be applied to serial data transmission for other different circuits. In the embodiments, details of the circuit of driver elements can be modified in various ways. For example, the data are sampled, for example, at leading or trailing edge of logic signals. However, as will be understood by a person skilled in the art, it is easily modified so that the data may be sampled at trailing or leading edge. The sampling block 359 samples a data when four successive data are decided to be the same. However, the number of successive data may be changed to a desired number.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A serial data transmission apparatus comprising:

a first memory means for storing a serial digital data;

a second memory means for storing inverted data of the serial digital data;

a data transmission means for transmitting clock signals, and one of the serial digital data from said first memory means, and an inverted data of the one of the serial digital data from said second memory means successively after the one of the serial digital data, the one of the serial digital data and the inverted data being transmitted for each of the clock signals in the order of the serial digital data with;

transmission line means connected to said data transmission means, said transmission line means comprising a line transmitting the data and the inverted data;

a data sampling means for receiving the data, the inverted data and the clock signal from said transmission line and for sampling a first data at a leading or trailing edge of the clock signal and a second data at a trailing or leading edge of the clock signal just after the leading or trailing edge; and a means for storing the first data as a data in a serial data only if the second data is an inverted logical data of the first data.

2. The apparatus according to claim 1, said transmission line means comprising the line transmitting the data and the inverted data and a line transmitting the clock signals, said data sampling means further comprising a delay means for delaying the data and the inverted data received through said transmission line.

3. The apparatus according to claim 2, wherein a delay time by said delay means is less than a time for transmitting the one of the serial digital data.

4. The apparatus according to claim 1, wherein said data sampling means receives a signal by a plurality of times successively within a time for transmitting the signal and samples the signal when the successive signals are the same.

5. The apparatus according to claim 1, wherein said data transmission means further transmits a latch signal when the serial data is transmitted, and said storing means latches the stored data as a parallel data.

6. The apparatus according to claim 5, wherein said data sampling means further comprising a delay means for delaying the latch signal received through said transmission line.

7. A method for transmitting serial data comprising the steps of:

storing a serial digital data;

storing inverted data of the serial digital data;

transmitting clock signals, and one of the serial digital data, and an inverted data of the one of the serial digital data successively after the one of the serial digital data, wherein the one of the serial digital data and the inverted data are transmitted for each of the clock signals in the order of the serial digital data;

receiving the data, the inverted data and the clock signals, and sampling a first data at a leading or trailing edge of the clock signal and a second data at a trailing or leading edge of the clock signal just after the leading or trailing edge; and storing the first data as a data in a serial data only if the second data is an inverted logical data of the first data.

8. A serial data transmission apparatus comprising:

a first data generator generating serial digital data;

a second data generator generating inverted data of the serial digital data;

a transmission means for transmitting first data and second data corresponding to the data and the inverted data generated by said first and second data generators according to a clock signal so that one bit of each of the serial digital data and the inverted data thereof comprises a sequential pair of data bits:

a data acquisition means for acquiring the first data and the second data transmitted by said transmission means in response to the clock signal; and an output means for outputting the first data as the serial data if the second data acquired by said data acquisition means is the inverted digital data of the first data acquired by said data acquisition means.

9. The apparatus according to claim 8, further comprising a light emission unit including a plurality of light-emitting elements, the light emission unit being connected to said output controller means, wherein said first data generator generates the serial data for controlling the emission of the light-emitting elements.

10. The apparatus according to claim 9, wherein said light emission unit is a unit for exposing a photoconductor.

11. The serial data transmission apparatus according to claim 8, wherein said data acquisition means acquires the first data in synchronization with one of the leading and trailing edges of the clock signal and acquires the second data in synchronization with the other of the leading and trailing edges of the clock signal.

12. A serial data transmission apparatus comprising:

a first data generator generating serial digital data;

a second data generator generating inverted data of the serial digital data;

a transmission means for transmitting the data and the inverted data generated by said first and second data generators according to a clock signal so that one of the serial digital data and the inverted data thereof comprises a pair of data:

a data acquisition means for acquiring a first data and a second data corresponding to the generated serial digital data and inverted data transmitted by said transmission means in response to the clock signal;

a delay means for delaying the data obtained by said data acquisition means by a time within a data acquisition period of said data acquisition means, wherein said data acquisition means acquires the first and second data delayed by said delay means; and an output means for outputting the first data as the one of the serial data if the second data acquired by said data acquisition means is the inverted digital data of the first data acquired by said data acquisition means.

13. A serial data transmission apparatus comprising:

a first data generator generating serial digital data:

a second data generator generating inverted data of the serial digital data;

a transmission means for transmitting the data and the inverted data generated by said first and second data generators according to a clock signal so that one of the serial digital data and the inverted data thereof comprises a pair of data;

a data acquisition means for acquiring a first data and a second data corresponding to the generated serial digital data and inverted data transmitted by said transmission means in response to the clock signal, wherein said transmission means transmits data with a period which is a half of the data acquisition period of said data acquisition means; and an output means for outputting the first data as the one of the serial data if the second data acquired by said data acquisition means is the inverted digital data of the first data acquired by said data acquisition means.

14. A method of transmitting serial data comprising the steps of:

generating serial digital data and inverted data thereof;

transmitting first and second data corresponding to the data and the inverted data according to a clock signal so that one bit of each of the serial digital data and the inverted data thereof comprises a sequential pair of data bits;

acquiring the first data and the second data transmitted in response to the clock signal;

outputting the first data as the serial data if the second data is inverted digital data of the first data.

15. An erasing apparatus comprising:

a linear light source comprising a plurality of light-emitting elements and set at a position opposing a photoconductor;

a first data generator generating serial digital data used for driving the light-emitting elements of said light source;

a second data generator generating data which is inverted data of the data generated by said first data generator;

a clock generator generating clock signals for transmitting the data for said light source;

a delay means for delaying the inverted data generated by said second data generator by a time within a half of a period of the clock signal;

a transmission means for transmitting the clock signals generated by said clock generator, the data generated by said first data generator, and the inverted data generated by said second data generator and delayed by said delay means;

a discrimination means for acquiring the data in synchronization with a leading or trailing edge of the clock signal and the inverted data in synchronization with a trailing or leading edge thereof, and for outputting the data if the inverted data acquired in synchronization with the trailing or leading edge is the inverted data of the data acquired in synchronization with the leading or trailing edge; and a means for storing the data output by said discrimination means and for driving all the light-emitting elements of said light source simultaneously according to the stored data at a prescribed timing.

16. The apparatus according to claim 15, wherein said light source, said discrimination means, and said storing means are arranged at a first section near the photoconductor, while said first and second data generators, said clock generator and said delay means are arranged at a second section different from the first section, and said transmission means connects the first and second sections for transmitting data between the sections.

17. The erasing apparatus of claim 15 wherein said discrimination means acquires the data in synchronization with one of the leading or trailing edge of the clock signal and acquires the inverted data in synchronization with the other of the leading or trailing edge of the clock signal.

18. A method of erasing a photoconductor comprising the steps of:

providing a linear light source comprising a plurality of light-emitting elements set at a position opposing a photoconductor;

generating serial digital data for driving the light-emitting elements of said light source;

generating data which is inverted data of the serial digital data;

generating clock signals for transmitting the data for said light source;

delaying the inverted data generated by said second data generator by a time within a half of a period of the clock signal;

transmitting the generated clock signals, the generated data, and the delayed inverted data;

acquiring the data in synchronization with a leading or trailing edge of the clock signal and the inverted data in synchronization with a trailing or leading edge thereof;

outputting the data if the inverted data acquired in synchronization with the trailing or leading edge is the inverted data of the data acquired in synchronization with the leading or trailing edge; and storing the output data and driving all the light-emitting elements of said light source simultaneously according to the stored data at a prescribed timing.

19. The method of claim 18 wherein the data is acquired in synchronization with one of the leading or trailing edge of the clock signal, and the inverted data is acquired in synchronization with the other of the leading or trailing edge of the clock signal.

20. An erasing apparatus comprising:

a linear light source comprising a plurality of light-emitting elements set at a position opposing a photoconductor;

a first data generator generating serial digital data for driving the light-emitting elements of said light source;

a second data generator generating data which is inverted data of the data generated by said first data generator;

a clock generator generating clock signals for acquiring data in a data acquisition period;

a delay means for delaying the inverted data generated by said second data generator by a time within a half of the data acquisition period;

a discrimination means for acquiring one bit of the serial data generated by said first data generator and the delayed inverted data thereof alternately, and for storing the one bit of the serial data only if the acquired inverted data is the inverted data of the acquired data.

21. The apparatus according to claim 20, wherein said light source and said discrimination means are located in a first block near the photoconductor, and said first and second data generators and said delay means are located in a second block different from the first block.

22. The apparatus according to claim 20, further comprising a transmission means for synthesizing the data generated by said first data generator and the inverted data delayed by said delay means alternately in correspondence to the clock signals generated by said clock generator.

23. A method of erasing a photoconductor comprising the steps of:

providing a linear light source comprising a plurality of light-emitting elements set at a position opposing a photoconductor;

generating serial digital data for driving the light-emitting elements of said light source;

generating data which is inverted data of the data generated by said first data generator;

generating clock signals for acquiring data in a data acquisition period;

delaying the inverted data by a time within a half of the data acquisition period;

acquiring one bit of the serial data generated and the inverted data alternately, and storing the one bit of the serial data only if the acquired inverted data is the inverted data of the acquired data.

* * * * *